(12) United States Patent
Oberst (10) Patent No.: US 8,910,419 B1
(45) Date of Patent: Dec. 16, 2014

(54) GROWING CHAMBER

(75) Inventor: David W. Oberst, Kalispell, MT (US)

(73) Assignee: All Season Greens, LLC, Kailspell, MT (US)

( * ) Notice: Subject to any disclaimer, the term of this patent is extended or adjusted under 35 U.S.C. 154(b) by 379 days.

(21) Appl. No.: 13/137,677

(22) Filed: Sep. 1, 2011

Related U.S. Application Data (60) Provisional application No. 61/379,490, filed on Sep. 2, 2010.

(51) Int. Cl.
*A01G 31/00* (2006.01)

(52) U.S. Cl.
USPC .............................................. 47/60

(58) Field of Classification Search
USPC ............ 47/39, 41.01, 48.5, 58.1 LS, 65.6, 47/66.5–66.7, 79, 82, 85, 86, 60, 61
See application file for complete search history.

(56) References Cited

U.S. PATENT DOCUMENTS

| | | | | |
|---|---|---|---|---|
| 2,928,211 | A * | 3/1960 | Martin | 47/60 |
| 3,458,951 | A * | 8/1969 | Martin | 47/60 |
| 3,755,524 | A * | 8/1973 | McKay | 264/138 |
| 3,868,787 | A * | 3/1975 | Wong, Jr. | 47/62 R |
| 4,060,947 | A * | 12/1977 | Naka | 52/179 |
| 4,244,145 | A | 1/1981 | Polacsek | |
| 4,493,163 | A | 1/1985 | de Monbrison | |
| 4,638,924 | A * | 1/1987 | Newsom | 222/1 |
| 5,101,593 | A | 4/1992 | Bhatt | |
| 5,209,012 | A | 5/1993 | Palmer | |
| 6,502,350 | B1 | 1/2003 | Dick | |
| 6,578,319 | B1 | 6/2003 | Cole | |
| 6,951,076 | B2 | 10/2005 | Winsbury | |
| 7,080,482 | B1 | 7/2006 | Bradley | |
| 7,184,846 | B2 | 2/2007 | Albright et al. | |
| 7,469,500 | B2 * | 12/2008 | Lovelace | 43/132.1 |
| 7,502,655 | B2 | 3/2009 | Albright et al. | |
| 7,559,173 | B2 | 7/2009 | Brusatore | |
| 8,061,080 | B2 | 11/2011 | Loebl et al. | |
| 8,234,812 | B1 * | 8/2012 | Colless et al. | 47/61 |
| 2002/0184820 | A1 | 12/2002 | Mauney | |
| 2006/0049170 | A1 * | 3/2006 | Luo | 219/486 |
| 2009/0235583 | A1 | 9/2009 | Colless et al. | |
| 2014/0020292 | A1 * | 1/2014 | McNamara et al. | 47/66.6 |

* cited by examiner

*Primary Examiner* — Isam Alsomiri
*Assistant Examiner* — Ebony Evans
(74) *Attorney, Agent, or Firm* — Luann Battersby, Battersby Law Firm (57) ABSTRACT

A growing chamber for irrigating, draining, lighting, heating or cooling plants that executes a schedule for at least one of the watering, lighting or heating or cooling to ensure that the chamber does not overload an electrical connection for at least one of 120 Volts or 240 Volts.

20 Claims, 3 Drawing Sheets

GROWING CHAMBER

CROSS REFERENCE TO RELATED APPLICATION

This application claims the benefit of U.S. Provisional Patent Application No. 61/379,490 filed Sep. 2, 2010, which is herein incorporated by reference.

BACKGROUND OF THE INVENTION

1. Technical Field

This application relates to growing plants hydroponically. More particularly, it relates to a growing chamber for growing plants.

2. Description of Related Art

There is a premium placed on the predictable production of food. This is due in part to our requirement for food to live, and also due to the increased desirability of fresh food and our rather stable need for calories.

One way to improve predictably of plants grown for consumption is to use a greenhouse because greenhouses offer improved climate control over open air farms. Greenhouses benefit from solar heat through convection, and thus are built to be transparent to let light in.

Another technique to improve plant yields is growing plants hydroponically. While plants naturally grow in soil, the soil only serves as a reservoir of nutrients. Thus, one can dissolve the nutrients in water and provide the fortified water to the plants. Hydroponics allow a user to provide very precise amounts and ratios of nutrients to plants.

Greenhouses and hydroponics are complementary technologies, and they scale well. An installation named Thanet Earth in England offers over 200 acres of hydroponically grown crops.

However, more than 40% of the land in United States is still used for farming Presently, it would be exceptionally difficult and expensive to convert this quantity of farmland to hydroponic greenhouses.

One inventive insight disclosed herein was that instead of trying to build ever larger greenhouses, to instead design and build modular growing chambers that can be used to replace small sections of a farm. If a farmer wishes to expand their production, they can buy or lease another growing chamber. To be practical, it's important that a farmer can simply have the growing chamber delivered as a turnkey solution—which led to the insight that a chamber should be designed to operate from sources already existing on farms, such as a 120 Volt power supply.

SUMMARY OF THE INVENTION

In one embodiment, an industrial growing chamber may be formed of insulated walls and a door. The chamber can be coupled to an electrical plug, via an electrical cord, and configured for a standard size. The chamber can have a racking system coupled to the insulated walls. There can also be a plurality of trays, including drainage, configured to be received by the racking system; a controller coupled to the chamber; a temperature control system, coupled to the chamber, configured to be controlled by the controller; an irrigation system, coupled to the chamber, configured to be controlled by the controller; a lighting system, coupled to the chamber, configured to be controlled by the controller; a timer coupled to the controller; and at least one of electronics or logic in the controller to execute a schedule for at least one of the temperature control system, the irrigation system, or the lighting system, in conjunction with the timer, to ensure that the chamber does not overload an electrical connection for at least one of 120 Volts or 240 Volts.

In another embodiment, a method for growing plants, by placing plants on a plurality of trays within an insulated chamber; plugging in an electrical plug coupled to the chamber, via an electrical cord, and configured for a standard size; watering the plants; lighting the plants; draining the plants; at least one of heating or cooling an interior of the chamber; retrieving a power value for the watering; retrieving a power value for the lighting; retrieving a power value for the heating or cooling; executing a schedule for at least one of the watering, lighting or heating or cooling to ensure that the chamber does not overload an electrical connection for at least one of 120 Volts or 240 Volts. Some advantages of these embodiments are executing a schedule that allows the chamber to connect to standard electrical sources, meaning that customers can purchase a turnkey solution, rather than having to plan and construct a greenhouse. Other advantages include the use of drainage to help prevent mold growth.

BRIEF DESCRIPTION OF THE DRAWINGS

These and other aspects, advantages and details of the present invention, both as to its structure and operation, may be gleaned in part by a study of the accompanying exemplary drawings, in which like reference numerals refer to like parts. The drawings are not necessarily to scale, emphasis instead being placed upon illustrating the principles of the invention.

DETAILED DESCRIPTION

Figure 1:
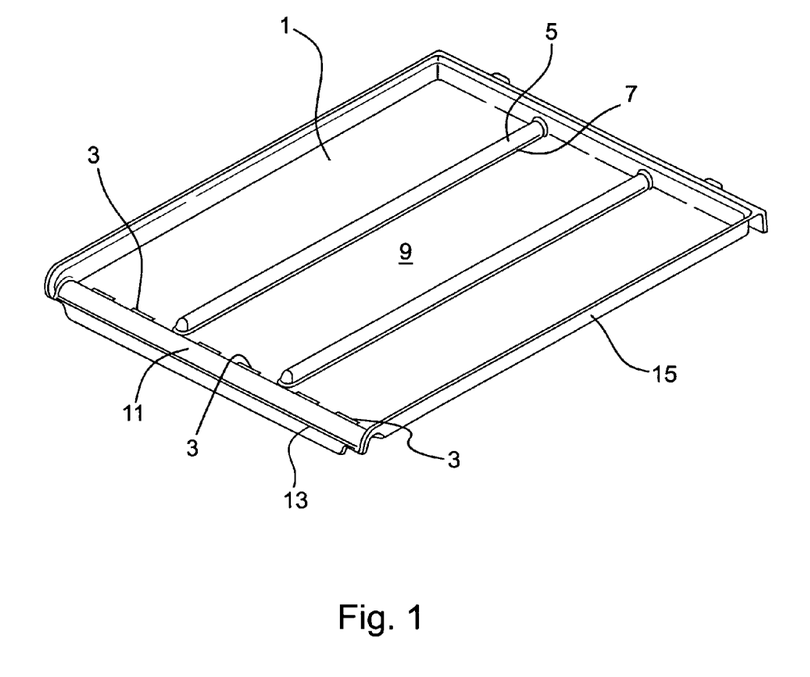
FIG. 1 is an illustration of exemplary trays with drainage slots.

FIG. 1 is an illustration of a tray 1 within the chamber 17 that may hold the seeds, sprouts or other plant material to be grown. Sprouts generally refer to plants that, once harvested, the entire plant is eaten, including the seed. Greens generally refer to plants consisting of or containing green leaves that may be harvested by separating them from the seed or root mass. Sometimes seeds can be sprouted or grown into greens. The term plants is broad, and intended to encompass seeds, sprouts, greens, and other plant material that can grow. An exemplary tray 1 to hold seeds, sprouts or plants to be grown may be optimally divided with preferably three to four bays 9 and separation flanges 5 that may include grooves 7. As shown in the side view and the front view tray 1 may be configured to slide 15 onto a racking system 23. A tray 1 may be configured to receive and be planted with seeds; the outside wall 11 may be grooved 13 and separation flanges 5 may be grooved 7 as to accommodate "root separation" material that may accommodate the different types of greens that may be grown in the system and may allow for easy harvest of greens, such as barley, oats, wheat or sunflower greens. A tray 1 may have drainage slots 3 in various locations placed to allow excess moisture from irrigation 35 to flow away from plants to help prevent mold growth. There may be a lip or other configuration to enhance air flow around trays 1 while in the racking system 23 and so promote plant growth.

Trays 1 may be made of human grade plastic for use in human consumption products, including greens produced to feed animals which may be consumed by humans as well as the product for the "organic" market. Trays 1 may have a width of approximately 36 inches and may be of widths of 30 inches to 35 inches and may be between 24 to 48 inches in length. Trays 1 may be configured to fit onto a racking system 23. Preferably, each tray 1 may allow for the capture of a maximum amount of water by the root mass of the greens, allowing growth at optimal rates, while also allowing drainage of maximal amounts of excess standing water under the root mass in the bottom of the trays 1 that could potentially promote mold growth. In the event irrigation 35 is through water purified with low levels of chlorine, the drainage capability further prevents potential "root burn" from the chlorine. Water drainage from trays 1 to the chamber 17 floor may be achieved via drainage slots 3 in the trays 1 themselves and by creating a desired pitch of the chamber 17 by slightly elevating the seeding end 57 of the chamber 17 at the time of system placement as to create water flow on the chamber 17 floor from the "seeding end" 57 towards the "harvesting end" 59 and out of the system's drain 29. Drainage water may be reclaimed for reuse with re-circulating pump via a filtration system that allows clean water to flow back into the water storage tank. Drainage water may be reclaimed for reuse with re-circulating pump, with or without a filtration system, which allows water to flow to a livestock watering trough. Drainage slots 3 in each tray 1 which may also allow for water conservation due to water reuse and the efficient use of water may positively influence energy costs, sustainability of a well, spring or other water source, and conservation of animal habitat. Discharge of water from the chamber 17 may be accomplished via a drain channel 29 and drain opening area 29 located at the harvesting end 59 of the chamber 17. Because of the method of water delivery, drainage and/or recapture techniques, the production of a highly nutritional living feed source may be achieved with water usage equivalent to approximately 5% for a comparative nutritional feed grown via standard production methods.

A racking system 23 may hold trays 1; it may be coupled to a hydroponic industrial growing chamber 17 by any of various conventional fasteners including a weld, solder, nut and bolt, screws, a clip, friction and a bayonet closure. The racking system 23 can assist with draining plants 21 through the sloping of the internal racking system 23. In one embodiment, the racking system 23 may be sloped about 0.125 inch per foot of throughout the racking system 23, such that water flows to the lower end. Such racking systems 23 may be of either one tray 1 width, two tray 1 width or three tray 1 widths, and may be removable. In another embodiment, the racking system 23 may be held in place by L-channel supports 43 which allow a user to perform walk-though cleaning (as opposed to a crossbar, which would provide additional mechanical stability, but bar the passage of a person).

In certain embodiments, reinforcements for racking 43 may be located in thirds in the chamber 17 floor and ceiling to support three horizontal rows of racks that are within. These rows may hold up to three trays 1 on the racking system 23 and the reinforcements 43 hold each of those 'lines' of racks as they progress from the seeding end 57 to the harvest end 59 through the chamber 17.

The different widths may determine the amount of available greens production per system 17 (another term for a chamber 17) as required by the user. Trays 1 may be loaded into the system at the seeding end 57 and unloaded at the harvesting end 59, as trays 1 may be cycled through the system. Loading of the trays 1 on a continual daily basis may be done by manually pushing the trays 1 along the racking system 23 to the harvesting end 59 of the chamber 17 where the trays 1 may be removed after harvest has occurred. The trays 1 may then be seeded and loaded once again at the seeding end 57 of the chamber 17 to begin the process anew. In one embodiment, a chamber 17 may have two insulated doors 61 (or two sets of insulated doors 61) on opposing ends such that one insulated door 61 is on a seeding end 57 and the other insulated door 61 is located at a harvesting end 59. Such a configuration allows a user to open a door 61 and load seeds. As trays 1 with seeds are loaded, other trays 1 can be pushed towards the door 61 on a harvesting end 59. In certain embodiments, a chamber 17 may have two non-insulated doors 61 (or two sets of non-insulated doors 61) on opposing ends, depending on ambient outdoor temperatures.

Figure 2:
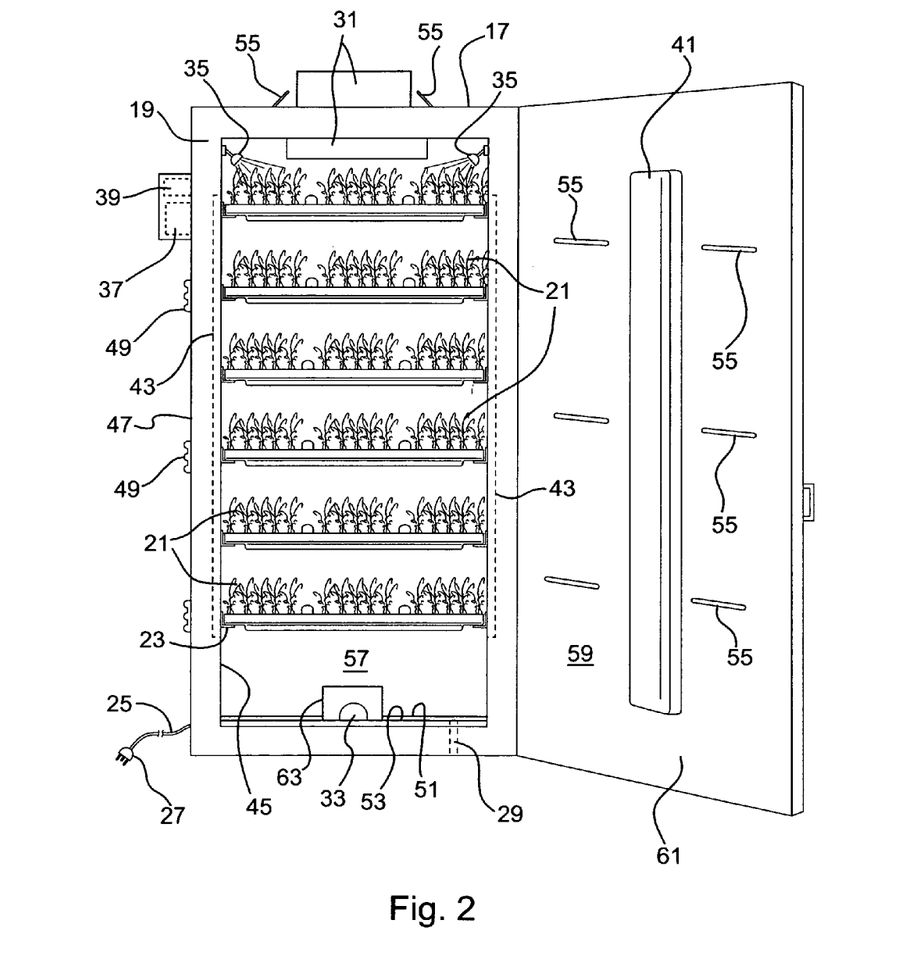
FIG. 2 is an illustration of an exemplary growing chamber.
Figure 3:
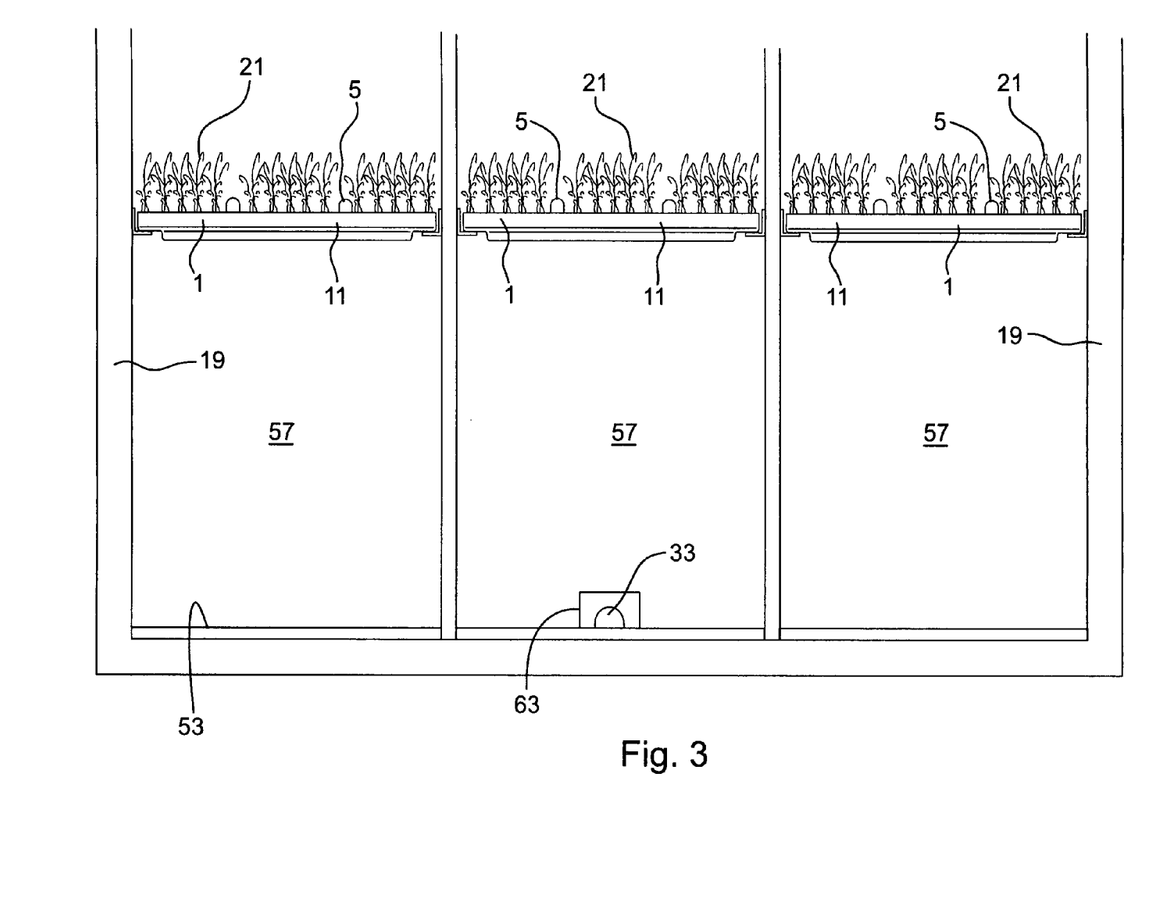
FIG. 3 is an illustration of an exemplary growing chamber.

FIG. 2 is an exemplary hydroponic industrial growing chamber 17 with insulated walls 19 and an insulated door 61, electrical powering of the hydroponic industrial growing chamber 17 provided by a three-pronged plug 27 coupled to the chamber 17 via an electrical cord 25 and configured for a standard size, a controller 37 that maintains and schedules various plant growth processes and is coupled to the chamber 17 and to a timer 39. This illustrates some of the resources that may be offered to plants 21 on the racking system 23: irrigation through a hose or piping system 35, lighting through a light system 41, and an HVAC system to provide both heating and cooling 31 to provide these resources. FIG. 3 also shows the growing chamber 17.

This hydroponic industrial growing chamber 17 (also called chamber 17 or container 17 or growing system 17) showing its housing, the insulated walls 19 and an insulated closed door 61 showing a handle or latch or notch of any conventional type so as to facilitate opening and closing the door 61. One insulated container 17 may be a hydroponic growing chamber 17 that may be specific in size based on the desired volume of living greens needed for feeding specific types and numbers of animals and/or humans. Materials used for insulation include various types of urethane including polyurethane, and other materials used for insulation may include synthetic foams, for example, polyisomeric foam or polystyrene or expandable polystyrene foam. Other materials that slow the transfer of heat may include glass wool, fiberglass or other plant materials including cellulose. In certain cases, materials which do not effectively slow the transfer of heat, such as the glass walls of a greenhouse, might not be considered insulation. Selection of insulating materials may depend upon cost and R values (a measure of insulating capability). An example may be a panel measuring 3.5 inches thick, constructed of a foam product, for example, polyurethane, and have an R value of twenty-five. Containers may be preferably housed in a closed, covered structure that can be heated to above freezing (preferably 40-45° F. degrees) during below freezing environmental conditions, not only allowing the user to work more comfortably but also avoiding potential shock to the plants 21 from freezing air when chamber 17 doors 61 may be opened. Alternatively, containers may be manufactured for placement outside and under roofs where allowable by temperate regions/zones.

Containers manufactured from polyurethane may have an approximate R value near twenty-five compared to an R value of approximately nineteen for 4 inch expanded polystyrene (EPS). Containers manufactured for placement within a structure that has an existing climate control system may be constructed with an R value near seventeen; containers manufactured for placement within a structure that has no climate control system may be constructed with an approximate R value between twenty to twenty-four. One approach to meeting inside and outside placement conditions in a chamber 17 may be to construct a chamber 17 of 3.5 inch polyurethane. Polyurethane panels 3.5 inch thick have an R value of approximately 25; compared to an R value of approximately 14-18 for 3 to 3.5 inch EPS. The increase in R value may allow for energy consumption in a commercial grade product at a savings that may be of significant value to the user. Some panels 45 may consist of a polyurethane foam core 19 that is sandwiched between two sheets of galvanized steel or aluminum and may be encased within a heavy-duty wood or high-density urethane frame. Panels 45 may be further reinforced 43 to allow for all of the internal racking 23 and components and any external components to be secured in place with fasteners including screws, and bolts. The outside and inside of a chamber 17 comprised of a panel may or may not be lined with an aluminum lining 45, a galvanized steel, or a fiberglass lining. Smooth aluminum may be preferred on the inside of panels 45 due to its ease of cleaning and the durable outside walls 47 may be embossed 49 or smooth on the outside durable walls 47. The floor may have an overlying low profile aluminum tread plate 51 covering the entire floor and thus may provide strength and enhance safety for those walking upon it; any other suitable flooring and type or grade of aluminum or other flooring material may be used and the floor. The flooring may have an underlying reinforcement 53 of the tread plate 51. The underlying reinforcement 53 may work both to support the internal racking system 23 and the chamber system 17 components. In one embodiment, this underlying reinforcement 53 of the tread plate 51 may be made of compressed foam or plastic board such as high density polyethylene (HDPE) plastic board (sold under the tradename Sintra, and available from Kysor.) The panels may form an enclosure through such fasteners as a weld, solder, nut and bolt, interlocking cams, screws, a clip or hinges. Interlocking cams may provide additional structural stability in the overall design so that no frame may be required and thus provide a more economical design, as well offering provision for fastening of the racking system 23 to the internal side walls. One approach may be to manufacture containers with BMP (Best Management Practices) to allow for maximum energy efficiency and minimal environmental impact while maintaining a cost effective product. A chamber 17 may be designed so that it may be moved conveniently and may be bolted to a custom built or non-custom built steel, plastic, wood or other frame that allows for safe transportation to its point of production via industrial and/or farm equipment such as a forklift, tow motor, crane or front-end loader of a tractor or other farm equipment. A frame may also serve as a base for the system to operate on. A chamber 17 may have any of many forms of ventilation, such as door vents 55 or wall vents 55, roof vents 55 or PVC-type roof piping 55, to allow for outside air exchange and the delivery of carbon dioxide to the greens/plants 21. The chamber 17 may be the result of retrofitting a structure, such as a used cargo shipping container reconfigured for use as a chamber 17. In this usage of recycled and/or retrofitted materials, the cargo shipping materials would be framed with steel or other metal, plastic or other rigid studs (preferably 2 inch by 4 inch studs) placed on the walls to facilitate racking stabilization by offering a surface that could accept a fastener to hold the racking system 23. A former cargo container may further have an expandable foam used for the insulation desired and a rubber sealer may be sprayed onto the inside of the chamber 17 and the facing of any expandable foam to seal the foam and make it water proof.

Electrical powering of the chamber 17 may be provided by a three-pronged plug 27 coupled to a chamber 17 via an electrical cord 25 and configured for a standard size. Many countries have standardized on sizes of electrical plugs, and the three-prong plug 27 and two-prong plug are generally accepted in the United States. One example of an electrical plug configured for a standard size may be a NEMA-compliant plug. In certain cases, a plug may be configured to fit a standard size by adding an adapter. The electrical powering may be provided to a hydroponic industrial growing chamber 17 in order to promote plant growth processes through various resources. Many components of a chamber 17 may be electrical. There may be commercial value in designing a system that can plug into a standard 120V 20 amp outlet. Additionally, certain users may value UL 508A certification, such that there may be commercial value in designing a system that can meet electrical code guidelines and gain further certifications including operation as a 120V UL508A industrial control panel, as well as an ETL, plug-and-run system that conforms to the National Electronic Code.

One version of the chamber 17 may be manufactured to run from a 120V source, while another version may run at 240V. A 120V system may be designed and built to operate on as a plug-and-nm appliance so that the system may be plugged into a household or standard 120V American outlet with the proper amperage rating complying with all safety standards. A 240V system may be designed to incorporate a four prong plug.

The system 17 may be built to be energy efficient and meet the National Electrical code, while allowing the optimal growing conditions to be maintained within the system. The 120 volt system may be able to run in most outdoor temperate environments, from well below 0° F. to well above 100° F., as well as in a protective shelter, although the container may be housed in an enclosed heated structure in order to maintain optimal performance during months when temperatures may be below freezing.

A 240 volt system may be designed for larger greens production requirements of the user. Like a 120V system, the 240V can be plugged in and operated. Alternatively, one could use the MCU/PLC 37 to operate a 240V device by splitting the 240V at the control box to have two separate 120V circuits available to work with. This approach may be scaled up and 240V systems may be preferable for agricultural/farm environments where a larger scale may be warranted. One implementation of the 240V system may be to double many of the components of the 120V system thus allowing for greater production of greens.

A controller 37 maintains and schedules plant growth processes and may be coupled to the chamber 17, thus creating value by bringing together agricultural expertise and electrical expertise. Both a timer 39 and a controller 37 may be coupled to the chamber 17. In certain embodiments, a controller 37 may be coupled to a physically separate timer 39, perhaps by an electrical wire. In other embodiments, a controller 37 may be coupled to a timer 39 that is part of the same electrical system, perhaps incorporated in the same microelectronics. A controller 37 may be any of a variety of micro control units, programmable logic controllers (MCU/PLC), microprocessors, microcontrollers, or other approaches to implementing logic (perhaps even an analog Babbage machine, though such an approach is not preferred). The MCU/PLC controller 37 may be a T6 (available from Trol Systems as a Microprocessor Control Unit), a Zelio Soft PLC (available from Schneider Electric), or a Jazz PLC (available from Unitronics) and/or any similar programmable control device 37 such as a microcontroller 37, a microprocessor 37 or other devices to execute logic and programming sequences and commands 37.

Advantages of programmable control devices 37 include the ability to conduct a wide variety of functions with relay assistance and a very low resistive load (e.g., 3 amp load). Programmable control devices, preferably able to withstand harsh environments, preferably have a remote timer 39 LCD screen that allows a user to view the operation that may be taking place inside the chamber 17, allowing for the change of timing but not the program.

One challenge may be that the nominal systems for a growing chamber 17 draw more power than may be provided from standard wiring sources if they are not controlled. The three devices that consume the most amperage are generally the chamber 17 air conditioner and heater (both examples of a temperature control system) 31 and the water pump; on a standard 120V 15/20 amp circuit, any two of these devices running at the same time would likely overload the circuit. There may also be a water storage tank 63 and a water tank heater 33, preferably 500-1000 watt. There may be 1, 2-4 or more, weather resistant, 2 lamp fluorescent light fixtures 41. There may be 1, 2-7 control solenoids for water distribution to the specific watering zones of the system. All of these devices operating together are likely over 30 amps and we have found them to be as high as 37 amps. The MCU/PLC 37 may be programmed to control amperage loads at all times, thus allowing the system to operate on a standard 120V circuit with proper amperage ratings. The MCU/PLC 37 may be further programmed with specific functions that allow the optimal environmental growing conditions to be created and maintained within the system for a wide variety of greens that require different and specific growing cycles. These cycles could be 3-4 days for "sprouts", 4-8 days for "greens" and up to 60 days for mature plants 21 or sprouted seeds such as forestry products.

The MCU/PLC 37 may be programmable so that it can signal, through a set of relays, each component of the system as to when to turn off and turn on. The MCU/PLC 37 (preferably Jazz PLC) may control all automatic operations, as follows in one example using a 2 hour cycle; in one embodiment, cycles may be programmed for any amount of time from ½ hour to 24 hours. The tank heater 33 turns on for 15 minutes, after it times out the tank heater 33 turns off and allows the water pump to spray for 1 minute, every 2 hours. After the 1 minute spray cycle the Jazz PLC 37 engages the electronic temperature controller (ETC), which may be a subcomponent of a controller 37 (e.g., within the Jazz PLC) to monitor the temperature inside the chamber 17. The preferable temperature may be between 64 to 72 degrees. The ETC 37 keeps the temperature between those 2 temperatures for 2 hours. In this 2 hour cycle the light 41 turns on for 20 minutes and off for 20 minutes, this repeats through the 2 hour cycle. After the 2 hour cycle, the Jazz PLC repeats the program starting with the tank heater 33. The Jazz PLC monitors its outputs, which may be connected to interlocking relays, and, in this embodiment, might not allow any two, of the three heavy amperage components to operate at any one time, and may be done through the written program, which may be installed in the Jazz PLC 37. When a certain system is manually turned to "Hand" operation mode the following may occur: All devices may be turned off except the water pump and the light 41; this allows power to run to the water pump, which allows the user to wash the grow trays 1 after harvest and to water the newly placed seed each day at the seeding end 57 of the chamber 17. The system may then placed back to "Auto" mode and the Jazz PLC 37 runs the program starting with the tank heater 33, and the process repeats.

One approach to prolong the life of the MCU/PLC 37 which assists plant processes in delivery of irrigation 35, lighting 41, and temperature maintenance, and may be that in this preservation interest IEC relays (relays meeting the International Electrotechnical Commission's standards) may be utilized in the control box to prolong the life of the MCU/PLC 37. They do so by reducing the magnetic interference within the control box. Additionally, it may be advantageous to install LEC relays because of their reliability, size, and capability to handle 100,000 operations depending on amperage load, and also their ability to withstand a harsh environment.

Safety may be enhanced by installing a disconnect switch outside the main control box with GFCI protection and to insure a safe shutoff means and personal protection in addition to disconnecting the plug. The industrial breakers that may be used in a 508A certified control panel such as used in the 240V chamber 17 feature a main breaker that may be installed to react if there may be a complete failure of the MCU/PLC 37 and a system overload occurs because all devices run at once.

It may be advantageous to install fuse blocks and fuses for all the devices in the control box, not only to comply with the NEC, but for safety as well in the 120V 20/30 amp plug-and-run chamber 17 system. Fuses react faster than breakers, and fuses are generally easier to replace than breakers if there is a fault. Fuses may also be preferable in a hydroponic growing chamber 17 system, instead of circuit breakers, because of their quicker reaction time to amperage overloads and because they may be easily replaced.

Irrigation 35 may be through a hose or piping system, lighting through a light system 41, and temperature maintenance, heating, cooling and ventilation may be provided by an HVAC system 31, within an industrial growing chamber 17, providing these resources to the contents of trays 1 on racking system 23. At least one of electronics or logic in the controller 37 may be in communication with water, light 41 or temperature resources to schedule at least one of an irrigation system 35, a lighting system 41 or an HVAC system 31, in conjunction with the timer 39, to ensure that the chamber 17 does not overload an electrical connection for at least one of 120 Volts or 240 Volts. Trays 1 may be located within a proximity to the irrigation 35 heads and sprinklers and so may allow for the proper water pressure required to thoroughly rinse the germination-inhibiting enzymes and/or alkaloids from the seeds, thus promoting rapid germination rates, a key to producing the 6-day growth cycle of the chamber 17 system. Trays 1 may be located on a racking system 23, at the seeding end 57 of the system, and may be approximately 2 inches from a chamber's 17 closed doors 61. Trays 1 may be located on racking system 23, at the harvesting end 59 of the system approximately 6 inches from the closed doors 61 allowing for proper light 41 dispersion onto the greens that are at or nearing harvest stages of growth.

Various types of lighting 41 including growth lights, LED light sources, incandescent, fluorescent or ultraviolet (UV) lights 41 may be employed to assist plant matter 21 in growth or greening up, or for air purification (UV lights may be used for this) 41. Standard grow lights 41 may be used, as well as specific color spectrum LED lighting 41. One approach may be lights 41 with a light spectrum 41 and Kelvin temperature that promotes plant growth may be used.

Grow lights 41 may be specifically kept away from the seeding end 57 of the chamber 17 to allow for proper germination of the newly loaded seed. To enhance light 41 distribution a reflective surface may be utilized within the chamber 17 to allow both day fifth and sixth plant matter 21 to receive optimal light 41. To enhance light 41 distribution LED or other lighting 41 may be placed on side wall areas at the harvesting end 59 of the chamber 17 to allow for both day fifth and day sixth plants 21 to receive optimal light 41. Lighting 41 may be located at the harvesting end 59 on the chamber 17 and may be mounted on the chamber 17 door 61. In one embodiment, lights 41 on the door 61 may run vertically as to displace light evenly on to all six layers of racking, if there are six sets of racking systems 23 (vertically there are six shelves or racks). This allows for plant matter 21 to be located on the racking system 23 approximately 6 inches from the closed doors 61 allowing for proper light 41 dispersion onto the greens that are at or nearing harvest stages of growth. This may be useful because sprouted living seeds, greens and plants 21 typically achieve their highest nutritional value levels on day six, the preferred harvesting and feeding day. Lighting 41 within the grow chamber 17 may be electrically controlled through the MCU/PLC 37 and a control relay which causes the light 41 to cycle on and off continuously. The lighting 41 cycles could be as short as 10 minutes or as long as several hours per on and off cycle.

Environmental control and optimum growth conditions may be partially provided by the HVAC (heating, ventilation, and air conditioning) system 31. In various embodiments, a temperature control system may be implemented by HVAC technologies (e.g., air conditioning, resistance heating, hydronics, fans with ventilation, or others) 31 alone or in combination, controlling access (e.g., airflow) with an external environment, heat exchanging or other approaches to changing the temperature of air inside a chamber 17. In certain embodiments, an HVAC system 31 may be mounted on a roof of a growing chamber 17. In certain embodiments, an HVAC system 31 may be ducted to internally to a chamber 17. In certain embodiments, both of these techniques may be employed. This system 31 may provide the heating and cooling needed to provide a preferable temperature range for growing greens of 66° F. to 70° F. A temperature encouraging many types of plants 21 to grow may be 69° F. Thus, an upper limit set point of 69° F. of the ETC/MCU/PLC 37 which causes the HVAC system 31 to operate may be desirable. One approach may be to maintain an upper set point +/−1-3 degree set point sensitivity setting on thermostat) so that a cooling system of the HVAC system 31 should engage when internal temperature rises to, or above 72° F. The upper limit control point may aid in the conservation of energy, which is often a major component in the overall cost of the production of greens. The upper limit control point, with its 3 degree sensitivity setting, also helps to ensure that when the ETC/MCU/PLC 37 senses an internal temperature in the range of 70° F., 71° F. or 72° F. or higher, cooling occurs. Thus, environmental conditions within the system may be maintained, and mold growth may be inhibited, a potential feature of the system and its growing environment. A chamber 17 may also provide heat 31 to enhance plant growth, preferably by setting temperature parameters such that a lower limit may be set to a point of 66° F. One approach may be to maintain a lower limit (−3 degree Fahrenheit sensitivity setting on thermostat) set point of 66° F. so that a heating system 31 may engage when the electronic temperature controller ETC/MCU/PLC 37 senses a temperature in the range of 65° F., 64° F. or 63° F. or lower. Heating, cooling and ventilation may come from any electrically-powered source including dish, tower, and vortex space and other heating units, air conditioners and air coolers, fans, and blowers.

In certain embodiments, a chamber may have the external ambient atmosphere pumped in, perhaps with a fan or heat exchanger or allowed in through vents. In certain embodiments, a chamber may have gasses added to the internal atmosphere, e.g., ozone, carbon dioxide or other gasses relevant to growing plant material.

Other temperature ranges may be used for various types of plants 21 such as warm season tropical berries, cool season greens and grasses and plants 21 that require controlled growing climates for viable, cost effective production such as medical marijuana. To control temperature, the system may utilize an electronic temperature controller (ETC) 37, an example of an easily programmed and adjusted ETC 37 such as the Ranco Electronic Temperature Controller 37 may be used; or preferably a Unitronics Jazz PLC which has ETC capabilities as part of its control capabilities 37. In such an embodiment, a temperature controller may be considered to be coupled to a controller because it is incorporated in a single device. The Jazz PLC is a preferred embodiment because it incorporates two thermo-couplers such that a single thermo-coupler may be programmed to sense air temperature, and may thus control both heating and cooling; concurrently, the second thermo-coupler sensor may be programmed to sense water temperature, thus controlling any tank heater 33 as well. The ETC 37 may have 2 stages, one for heating and one for cooling from an HVAC system 31. The ETC 37 may further have a digital readout for viewing the temperature inside the chamber 17 and for changing the temperature parameters.

Water flow from the pump to irrigation 35 zone(s) throughout the chamber 17 may occur at specifically timed intervals through the MCU/PLC 37 and the opening and closing of one or more solenoids located within the piping network of the chamber 17. The intervals may be determined by the specific type of seed being grown and for what purpose. The intervals can be of any length of time or could be as specific as every hour or an even smaller interval. The intervals may also change as the water demands of the seed change to water demands of a sprout, a green or even a plant 21. Irrigation 35 within the grow chamber 17 may be electrically controlled through the MCU/PLC 37 and a series of control relays and solenoids. Water flow into the unit may start from an external water source which may be connected to a chamber 17 and flow into an internal water storage tank 63. The water storage tank 63 may have a float valve that closes the source water valve when the water level within the water storage tank 63 may be at a maximum volume. Water may be disbursed to plants 21 within a chamber 17 through devices such as a sprinkler, irrigation 35 heads, a sprayer, a nozzle and a piping or pipeline system. A pipeline system may use pipes made from PEX, which is a crosslinked high density polyethelene (HDPE) polymer because PEX is flexible, resistant to scale and chlorine, and does not corrode or develop pinholes. Other piping lines or piping system materials may be metal pipes including those made of copper, or iron and rigid plastic pipes including those made of PVC, CPVC, or ABS, or other flexible pipes. Lead piping may also function to conduct water but this is not a preferred embodiment due not only to its environmental unsoundness but also because best practices link piping made of plastic materials to other piping made of plastic materials to avoid corrosion and the chamber 17 preferably contains plastic piping.

Water pressure at the irrigation 35 heads may be between 15-30 psi, such that with the proper placement of the racking and piping, water pressure may be directed onto the seeds at the seeding end 57 of the chamber 17, with the goal of assuring the proper water and pressure to thoroughly rinse the germination-inhibiting enzymes and or alkaloids from the seeds of different types, thus promoting germination. This approach allows germination to occur in as little as 24 hours or less, which may be 2-3 times faster than normal germination rates.

Water may flow through the piping to the irrigation 35 heads through a network on internal piping to prevent freezing. Other examples of sources of supply of water or water-supplemented irrigation 35 may be through other types of piping including PEX or copper piping or through a hose from any water bid when above-freezing temperatures may be involved; the water may be delivered through a heated water hose if below-freezing temperatures may be involved. In larger scale agricultural operations, as well as remote outdoor environments the water may be delivered through one or more water storage tanks 63 located outside of and independent to the chamber 17. A thermostat may be placed in the water storage tank 63 to control the tank heater 33 as to prevent shock to the plants 21 from cold water during the irrigation 35 phase of the cycle and freeze-out damage or breakage to the piping. Water flow from the storage tank 63 to the re-circulating pump may be accomplished with internal piping connecting the two. The pump may deliver between 2 to 10 gallons per minute and operate at a PSI of between 25 to 50 psi. Water, preferably from a naturally occurring source including a spring, a well, a stream or river, and may be filtered to allow for proper operation of the irrigation system 35 and a customer-specific filtration system may be provided based upon results of tests of individual water quality supplies. Water may be supplemented through injector pumps in the irrigation 35 piping with nutrients to enhance growth or fortify nutrient content of the plants 21 at harvest or retard elements such as bacteria or viruses that diminish desired plant growth. An example may be the use of a small amount of a natural chemical, iodine, used as an anti-biological to kill or control various undesirable aerobic and/or anaerobic growths. An example of an addition that may serve a nutrient and anti-bacterial and/or anti-virus biological control function and an example of how this water supplement might be applied to the plants 21 may be the addition of a sea salt or sea salt-type solution during the last 20 seconds of a watering cycle 2 or 3 times during the day. Supplements may be natural or synthetic anti-herbicides, anti-pesticides, anti-fungals, natural or compounded vitamins, minerals or other plant growth enrichments, fortifications or promoters. Gases, such as ozone or carbon dioxide, may also be added to the water.

One approach to scheduling to avoid an overloading of a system may include storing information regarding how much power is drawn by various system components. Exemplary power values may be measured in volts or amps. In certain embodiments, these values may include imaginary components, e.g., using RMS values. One approach is to encode such information in a memory of a controller 37 when the chamber 17 is manufactured. Another approach is to connect voltmeters, ammeters, or other electrical monitoring devices to various systems within a chamber 17 such that a controller 37 can retrieve the amount of power being consumed by an irrigation system 35. A controller 37 may be configured to run at 120 V or 240 V, and/or a corresponding amperage. Certain controllers 37 may be able to switch between voltage settings, or standardized amounts of electricity. A controller 37 may be programmed to know which systems may be run at partial power (e.g., irrigation 35, because plants 21 can receive the water over a longer period), and how often systems need to operate (e.g., if air temperature is stable, a controller 37 may decide to delay causing the temperature to rise in order to continue providing light 41 as this may do more to help plants 21 grow). A controller 37 may be programmed to know that operating a tank heater 33 requires a lot of power, and thus operate may the tank heater 33 when the air temperature inside the chamber 17 is at an upper end of the acceptable range on the theory that an HVAC air temperature control system 31 is least likely to require power at that moment. Analogous to the example of the air temperature, if water tank heater 33 temperature is stable, a controller 37 may decide to delay causing the water heater 33 temperature to rise. By taking advantage of these insights, the various systems do not need to be continuously running, the controller 37 may be able to assign to each of them a time slot such that each function is completed while staying within a power budget. While in many cases the optimization needs may be simple enough that a schedule can be created by repeatedly querying if the controller 37 can operate the next highest power-consuming device that has not yet been run in a given time window, more complex systems may use stochastic models, and related techniques such as simulated annealing. In certain embodiments, a schedule may be hard-wired into a controller 37, in other embodiments, a schedule may be created dynamically. Both situations may be examples of a controller 37 executing a schedule.

A chamber 17 may be built to various sizes. In certain embodiments, a chamber 17 may be sized to have a low enough ceiling to allow for easy cleaning, such as heights or ceilings in rooms, e.g., seven to eleven feet. In certain embodiments, a chamber 17 may have a width determined by a desired number of tray widths, e.g., one, two three or four. In certain embodiments, a chamber 17 may be designed to fit within a certain space, such as underneath a roof, or within a barn. In certain embodiments, a chamber 17 may be sized to reduce shipping costs, e.g., not be a wide or oversized load. Such a chamber should be not more than eight and one half feet wide, and/or not more than 13½ feet high. These values are totals, so if a chamber 17 has a HVAC system 31 mounted on the roof, then the cubic structure of the chamber 17 may be limited to ten feet tall such that the total height including the top of the HVAC system 31 remains within 13½ feet. In certain embodiments, a chamber 17 may be sized to fit within a 463L pallet (i.e., for military aircraft, 104 inches length×84 inches width×96 inches height).

The language above is intended to provide examples and guidance, rather than limiting requirements. Persons having ordinary skill in the art may understand that other combinations and elements may be used to the same effect, for example, plastic components such as piping may be constructed from metal where freezing is not a concern. The electrical codes referenced, particularly the National Electrical Code, are hereby incorporated by reference.

The invention claimed is:

1. An industrial growing chamber, comprising:
a door and insulated walls forming a chamber;
an electrical plug coupled to the chamber, via an electrical cord, and configured for a standard size;
a racking system coupled to the insulated walls;
a plurality of trays, including drainage, configured to be received by the racking system;
a controller coupled to the chamber;
a temperature control system, which is coupled to the chamber, configured to be controlled by the controller;
an irrigation system, coupled to the chamber, configured to be controlled by the controller;
a lighting system, coupled to the chamber, configured to be controlled by the controller;
a timer coupled to the controller; and
at least one of electronics or logic in the controller configured to ensure that the chamber does not overload an electrical connection for 20 amperes and at least one of 120 volts or 240 volts by executing a schedule for at least one subsystem chosen from a group consisting of the temperature control system, the irrigation system, and the lighting system, in conjunction with the timer, wherein the schedule is based on a power consumption of at least one of the chamber or a different subsystem.

2. The chamber of claim 1, comprising a second door on an opposing side of the chamber from the door.

3. The chamber of claim 1, comprising synthetic foam in the door.

4. The chamber of claim 1, wherein the insulated walls are opaque.

5. The chamber of claim 1, comprising at least one of a water tank or a water tank heater.

6. The chamber of claim 1, comprising a tread plate.

7. The chamber of claim 1, wherein the racking system includes an L-channel configuration.

8. The chamber of claim 1, comprising plastic piping.

9. The chamber of claim 1, wherein the trays include human grade plastic.

10. The chamber of claim 1, wherein the temperature control system is configured to maintain an approximately six degree Fahrenheit temperature range.

11. A method for growing plants, comprising:
    placing plants on a plurality of trays within an insulated chamber;
    plugging an electrical plug, coupled to the chamber, via an electrical cord, into a standard connection;
    watering the plants;
    lighting the plants;
    draining the plants;
    at least one of heating or cooling an interior of the chamber;
    retrieving a power value for the watering;
    retrieving a power value for the lighting;
    retrieving a power value for the heating or cooling;
    ensuring that the chamber does not overload an electrical connection for 20 amperes and at least one of 120 volts or 240 volts by executing a schedule for at least one task chosen from a group consisting of the watering, lighting and heating or cooling, wherein the schedule is based on a power consumption of at least one of the chamber or a different task.

12. The method of claim 11, wherein the insulated chamber includes a first door on an opposing side of the chamber from a second door.

13. The method of claim 11, wherein the insulated chamber includes synthetic foam in a door.

14. The method of claim 11, comprising blocking light from entering the chamber.

15. The method of claim 11, comprising at least one of heating water or storing water in a tank.

16. The method of claim 11, wherein the insulated chamber floor includes a tread plate.

17. The method of claim 11, wherein a racking system includes an L-channel configuration.

18. The method of claim 11, comprising piping water through plastic piping.

19. The method of claim 11, wherein the trays include human grade plastic.

20. The method of claim 11, comprising maintaining an approximately six degree Fahrenheit temperature range.

* * * * *